United States Patent
Viale

[11] Patent Number: 5,722,510
[45] Date of Patent: Mar. 3, 1998

[54] DEVICE FOR CONTROLLING THE RETRACTION OF A MOBILE STRUCTURE

[75] Inventor: Daniel Viale, Tanneron, France

[73] Assignee: Societe Nationale Industrielle et Aerospatiale, Paris Cedex, France

[21] Appl. No.: 628,517

[22] Filed: Apr. 5, 1996

[30] Foreign Application Priority Data

Apr. 19, 1995 [FR] France .................. 95 04642

[51] Int. Cl.⁶ .................................. B64G 1/66
[52] U.S. Cl. .................. 185/40 R; 192/66.2; 192/82 T; 192/101
[58] Field of Search .................. 192/82 T, DIG. 1, 192/66.2, 101; 74/89.18, 661; 185/40 R, 40 B; 403/28

[56] References Cited

U.S. PATENT DOCUMENTS

| | | | |
|---|---|---|---|
| 4,086,991 | 5/1978 | Swadley | 192/82 T |
| 5,103,949 | 4/1992 | Vanderzyden et al. | 192/82 T X |

FOREIGN PATENT DOCUMENTS

| | | |
|---|---|---|
| 0 309 650 | 4/1989 | European Pat. Off. |
| 0 456 950 | 11/1991 | European Pat. Off. |
| 0 496 183 | 7/1992 | European Pat. Off. |
| 2 667 842 | 4/1992 | France . |
| WO 91/19645 | 12/1991 | WIPO . |

*Primary Examiner*—Richard M. Lorence
*Attorney, Agent, or Firm*—Oblon, Spivak, McClelland, Maier, & Nuestadt, P.C.

[57] ABSTRACT

A unit for controlling the retraction of a mobile structure such as a mirror used for calibrating an optical system on board a spacecraft, which includes a spring which permanently forces the mobile structure towards its retracted position and a memory material member, wherein a change of state of the memory material disconnects a connecting system placed in a transmission mechanism normally connecting a control motor to the mobile structure. The connecting system normally ensures the joining by friction of two parts of the transmission mechanism between which the spring acts. A heating system controls the change of state of the memory material member.

10 Claims, 2 Drawing Sheets

DEVICE FOR CONTROLLING THE RETRACTION OF A MOBILE STRUCTURE

BACKGROUND OF THE INVENTION

1. Field of the Invention

The invention relates to a device making it possible to control the retraction of a mobile structure normally connected to displacement control means by a transmission mechanism, particularly in the case of a failure of said displacement control means.

A preferred use of such a device is in the space field. Thus, optical systems carried on spacecraft, such as satellites and probes, may no longer be able to fulfil their mission in a satisfactory manner if an initially mobile structure e.g. used to permit a regulation or calibration of the system, is locked in a random position, particularly as a result of a failure of the motor normally controlling its displacement, or the breaking or seizing of a mechanical connecting component.

2. Discussion of the Background

WO-A-91 19 645 proposes a device for controlling the retraction of a mobile structure, in which the structure is brought into a retracted position by spiral or torsion springs, when a pyrotechnic shear is actuated for disconnecting the motor from the mobile structure, whose displacement is controlled by said motor.

In practice, such a pyrotechnic shear has large overall dimensions and a high weight. Moreover, its use produces a shock, which can damage certain components of the optical system in the vicinity thereof, or can modify their setting.

WO-A-91 19 645, as a variant, also proposes replacing the pyrotechnic shear by an electromagnetic suction grip or a thermal knife. However, once again these are large, heavy systems, while doubts exist concerning their reliability.

As illustrated by FR-A-2 648 199, it has already been proposed to carry on a spacecraft a member made from a memory material in order to control the unclamping or release of a component such as an antenna or solar panel following launch.

FR-A-2 667 842 also proposes the use on a spacecraft of memory material members for controlling the release of rotary mechanisms incorporating ball bearings following the launch of the craft.

In the two latter documents, the memory material members are used in order to ensure a release, i.e. the bringing into the operating state of a system which must be fastened during launch in order to avoid it being damaged by violent vibrations occurring during this period. However, it has never been envisaged to use such a member for controlling the retraction of a normally mobile structure.

SUMMARY OF THE INVENTION

The invention relates to an original device making it possible to control, if this proves necessary, the retraction of a mobile structure without inducing a shock and in a particularly simple and reliable manner, for smaller overall dimensions and weight levels than in comparable, existing devices.

According to the invention, this result is achieved by means of a device for controlling the retraction of a mobile structure, which is normally connected to displacement control means by a transmission mechanism, said device incorporating disconnectable connecting means included in the transmission mechanism, and elastic means permanently acting on the mobile structure in order to automatically bring the latter into a retracted position during a disconnection of the disconnectable connecting means, characterized in that it also comprises a memory material member able to act on the disconnectable connecting means in order to control the disconnection thereof, during a state change of the material, and heating means associated with said member in order to control the state change thereof on crossing a predetermined temperature threshold.

In a preferred embodiment, the transmission mechanism comprises a first part which can be actuated by displacement control means and a second part carrying the mobile structure. The disconnectable connecting means then incorporate a tie, which traverses the first part and the second part, so as to normally join them together by friction.

The tie then advantageously defines a pivoting axis of the second part with respect to the first part, the elastic means permanently exerting a pivoting torque between the first and second parts about the axis thereof.

According to the preferred embodiment of the invention, one of the first and second parts incorporates a tubular portion, which has two truncated cone-shaped, end surfaces, the other of the first and second parts having two end fittings connected to one another by the tie through the said tubular portion. Truncated cone-shaped, bearing surfaces formed on the end fittings and complimentary of the truncated cone-shaped end surfaces of the tubular portion are normally pressed against the latter surfaces by the tie.

In this case, the memory material member is a tubular member mounted on the tie within the tubular portion, so as to be able to move apart the truncated cone-shaped bearing surfaces formed on the end fittings with respect to the truncated cone-shaped end surfaces formed on the tubular portion, during the change of state of the material.

Advantageously, thermally insulating washers are interposed between the end fittings and the memory material member, so as to ensure a uniform temperature rise of said member with a minimum dispersion.

In the aforementioned embodiment, the truncated cone-shaped end surfaces and the complimentary, truncated cone-shaped bearing surfaces are not self-locking.

Preferably, the first part is supported in pivoting manner by a fixed structure about the axis defined by the tie. The displacement control means then incorporate a motor supported by the fixed structure and whereof an output shaft rotates the first part.

In the preferred embodiment of the invention, the tie has a reduced resistance region allowing its elongation under the action of the memory material member during a change of state of said material.

BRIEF DESCRIPTION OF THE DRAWINGS

The invention is described in greater detail hereinafter relative to a non-limitative embodiment with reference to the attached drawings, wherein is shown.

DESCRIPTION OF THE PREFERRED EMBODIMENTS

Figure 1:
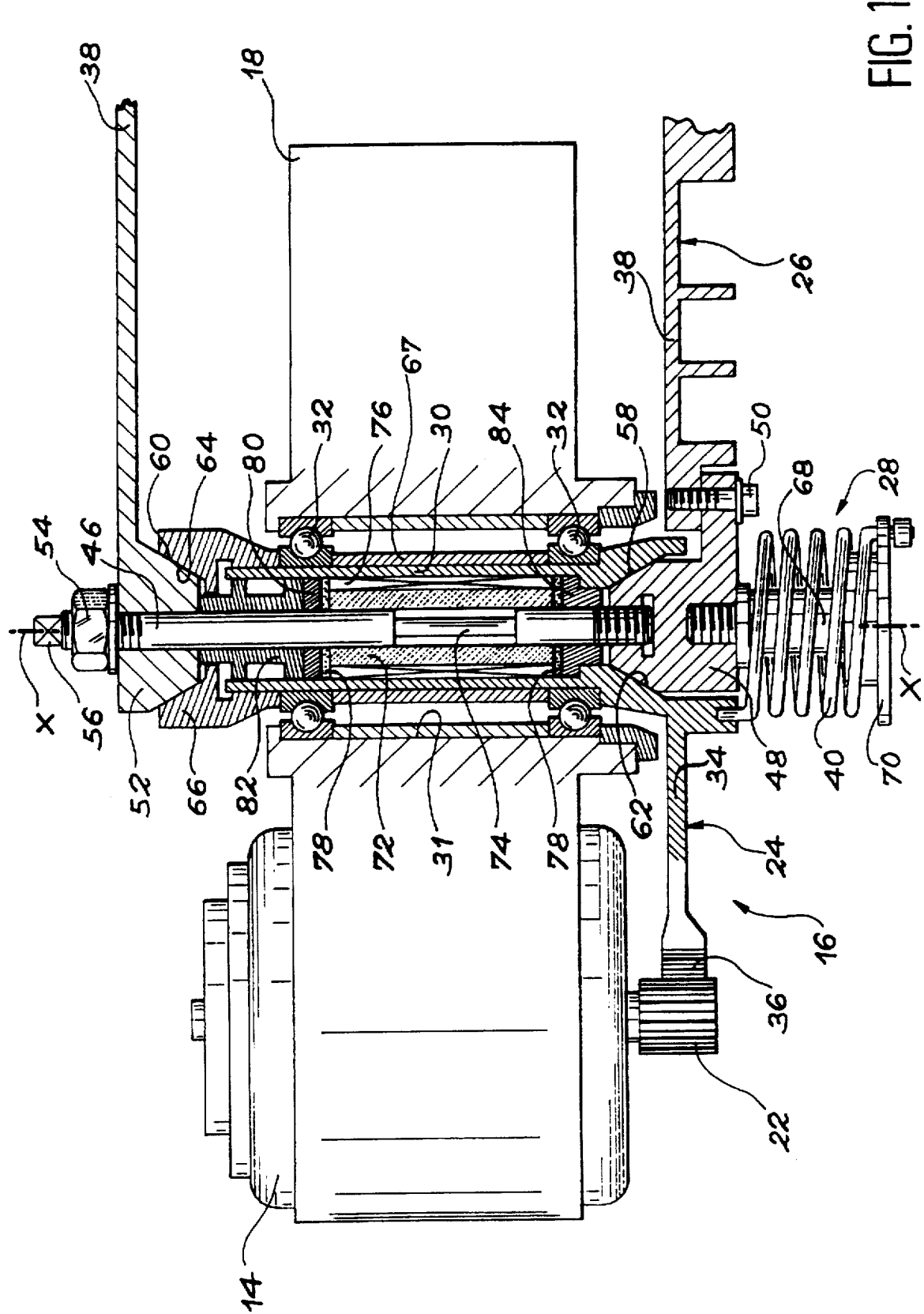
FIG. 1 which illustrates a front view in partial section showing a mechanism making it possible to control the displacement of a mobile structure such as a mirror, said mechanism incorporating a retraction control device according to the invention.
Figure 2:
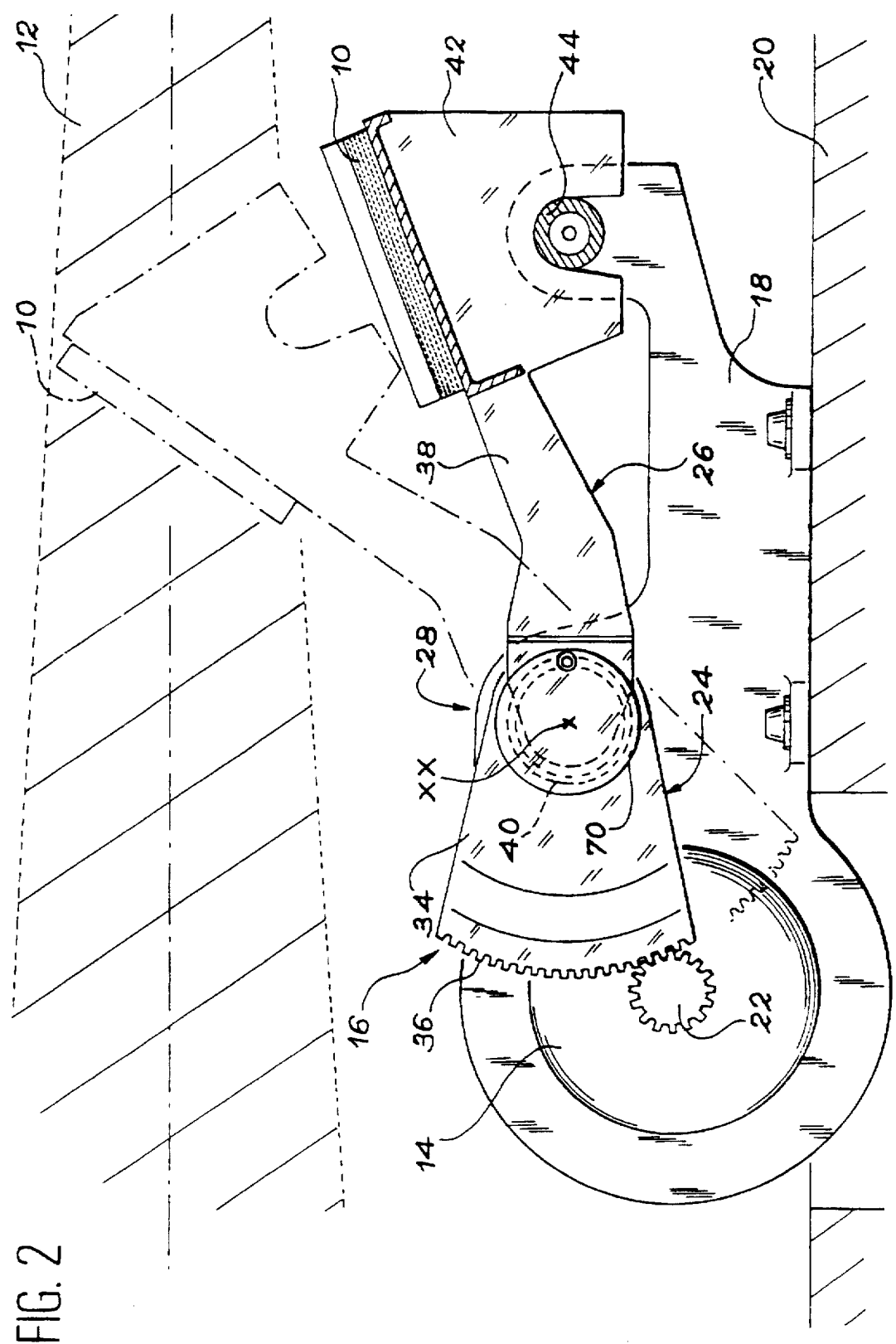
FIG. 2 which illustrates a side view of the mechanism illustrated in FIG. 1.

The mechanism illustrated in FIGS. 1 and 2 is intended to be carried on a spacecraft such as a satellite or probe. This mechanism is designed to control the pivoting of a mobile structure constituted by a mirror 10 (FIG. 2) about a pivoting axis XX. As is diagrammatically illustrated in broken line form in FIG. 2, after launch, this pivoting makes it possible to bring the mirror 10 onto the optical path 12 of a not shown optical system in an optionally regulated position. In this position, the mirror 10 makes it possible to perform on the optical system an operation such as a calibration or setting. When this operation is completed, the operation of the optical system requires the retraction of the mirror 10 to its position shown in continuous line form. If, for any reason, this retraction cannot be obtained, the optical system is made inoperative.

The mechanism shown in FIGS. 1 and 2 comprises an electric stepper motor 14, constituting displacement control means for the mirror 10, as well as a transmission mechanism 16 through which the electric motor 14 drives the mirror 10. The assembly is mounted on a fixed support structure 18 which is to be fixed to the structure 10 of the satellite or probe, as shown in FIG. 2.

The body of the electric motor 14 is directly mounted in the fixed support structure 18. The latter also defines the pivoting axis XX of the mirror 10, as will be shown hereinafter.

The transmission mechanism 16 comprises a pinion 22 keyed on the output shaft of the electric motor 14, together with a first part 24 and a second part 26, normally joined to one another by disconnectable connecting means 28.

The first part 24 of the transmission mechanism 16 comprises a tubular portion 30 mounted in a bore 31 traversing the fixed support structure 18 along axis XX. More specifically, the tubular portion 30 is mounted in the bore 31 by bearings 32, such as oblique contact ball bearings, so that the first part 24 can freely pivot about the axis XX with respect to the support structure 18. At one of its ends, the tubular portion 30 of the first part 24 has a plate member 34 terminated by a toothed segment 36 engaged on the pinion 22. As a result of this arrangement, rotation in one or other direction of the pinion 22, controlled by the electric motor 14, pivots the first part 24 about the axis XX.

The second part 26 of the transmission mechanism 16 comprises a mirror-carrying portion 42, as well as two parallel plates 38, which project towards the axis XX from its mirror-carrying portion. The ends of the plates 38 are normally joined to the first part 24 by disconnectable connecting means 28. In order to ensure a satisfactory operation of these disconnectable connecting means 28, the plates 38 have a certain flexibility parallel to the axis XX. This result can easily be obtained by giving them a limited thickness and by making them from an appropriate material.

The disconnectable connecting means 28 belong to a device for controlling the retraction of the mobile structure 10. When the retraction control device is operated, the disconnectable connecting means 28 disconnect the second part 26 from the first part 24. A spiral or torsion spring 40, whose ends are respectively fixed to the first part 24 and the second part 26, then automatically controls the pivoting of said second part in a counterclockwise direction considering FIG. 2, until the mirror-carrying portion 42 of the second part 26, which carries the mirror 10, bears against an abutment 44 formed for this purpose on the fixed support structure 18. Thus, the mirror 10 is automatically Brought into the retracted position illustrated in continuous line form in FIG. 2, no matter what position was initially occupied by said mirror. In this retracted position, the mirror 10 is completely displaced from the optical path 12, so that the corresponding optical system can be continuously used without damage.

A more detailed description will now be given of the retraction control device according to the invention with reference to FIG. 1.

The disconnectable connecting means 28 incorporate a tie 46 positioned along the axis XX and connecting the ends of the plates 38 on passing through the tubular portions 30 located between said ends.

More specifically, a threaded end of the tie 46 is screwed into a dismantlable end fitting 48 forming the end of one of the plates 38. The end fitting 48 is connected to said plate 38 by screws 50. The end of the other plate 38, terminated by a second end fitting 52, is traversed by the tie 46. In its portion projecting beyond the second end fitting 52, the tie 46 also has a threaded portion on which is received a nut 54. Beyond its threaded portion receiving the nut 54, the tie 46 has a manipulating head 56 making it possible to screw the tie 46 into the dismantlable end fitting 48 by means of a wrench. On their facing faces, the end fittings 48 and 52 respectively have truncated cone-shaped bearing surfaces 58, 60.

The tie 46 is fitted coaxially within the tubular portion 30 of the first part 24, so that the truncated cone-shaped bearing surfaces 58, 60 formed on the end fittings 48, 52 are normally pressed against the truncated cone-shaped end surfaces 62, 64, complimentary of the surfaces 58 and 60 and formed in said tubular portion 30.

More specifically, the truncated cone-shaped end surface 62 is formed directly on the tubular portion 30 at its end carrying the plate member 34, whereas the truncated cone-shaped end surface 64 is formed on a race 66, which slides freely on the opposite end of the tubular portion 30. This two-part arrangement makes it possible to ensure an effective fitting or keying of the races within the ball bearings 32, by means of a spacer 67 placed between these races, when a compressive force is exerted between the end fittings 48 and 52 by the tie 46.

Contrary to the truncated cone-shaped bearing surface 58, the detachable end fitting 48 supports a post 68 terminated by a disk 70. The post 68 is positioned along axis XX within the spiral or torsion spring 40. In practice, the end of said spiral or torsion spring connected to the second part 26 is fixed to the disk 70, as shown in FIG. 1.

Besides the disconnectable connecting means 28 and elastic means constituted by the spiral or torsion spring 40, the retraction control device for the mirror 10 comprises a tubular member 72 made from shape memory material and which is located between the end fittings 48 and 52 around the tie 46 and within the tubular portion 30 of the first part 24. The memory material member 72 is dimensioned in such a way that its length does not prevent the joining by friction of the parts 24 and 26 by means of the truncated cone-shaped surfaces 58 and 62 on the one hand and 60 and 64 on the other, when the nut 54 is tightened and when the mechanism is at a normal operating temperature.

However, when the temperature of the memory material member 72 rises above a predetermined temperature threshold (e.g. between 60° and 100° C.), the dimensioning is such that the elongation of said member (e.g. by approximately 1 mm) has the effect of moving the end fittings 48 and 52 sufficiently apart to eliminate the joining by friction of the parts 24 and 26. In order for the separation of said parts to take place correctly, it should be noted that the connections by friction normally ensured between the complimentary truncated cone-shaped surfaces 58, 62 on the one hand and 60, 64 on the other are not self-locking.

In order that the elongation of the memory material member 72 has the effect of spacing apart the end fittings 48, 52, FIG. 1 shows that the tie 46 has a reduced resistance region 74. The region 74 can be constituted by a zone in which the diameter of the tie 46 is sufficiently reduced to permit its elongation, when a force tending to move apart the end fittings 48 and 52 is applied by the memory material member 72.

In order to ensure the crossing by the material forming the tubular member 72 of its phase change temperature, said tubular member is surrounded by heating means 76, e.g. constituted by an electrical resistor. The electric power supply of the resistor forming the heating means 76 is from an external source using electrical conductors not shown in the drawings.

In the embodiment shown, an insulating washer 78 is placed at each end of the tubular, memory material member 72, in order to ensure a uniform temperature rise with minimum dispersion. In addition, a thickness washer 80 and a bearing spacer 82 are interposed between the end fitting 52 and the adjacent insulating washer 78. A bearing ring 84 is interposed between the end fitting 48 and the adjacent insulating washer 78.

The bearing spacer 82 and bearing ring 84 make it possible to transmit the elongation of the tubular member 72 to the end fittings 52, 48. The thickness washer 80 is machined in the required way so as to ensure the minimum clearance for satisfactory operation of the tubular, memory material member 72.

At the time of launch, the mechanism shown in the drawings is locked in the retracted position illustrated in continuous line form in FIG. 2 by a not shown clamping device associated with the abutment 44. This clamping device can be made in a random manner and does not form part of the invention.

When the satellite or probe is under operationally conditions, the clamping device is operated so as to release the mechanism. The mirror 10 can then be brought, as desired, into the requisite position with the aid of the electric motor 14, e.g. in order to carry out a calibration or setting of the optical system. To permit the use of the optical system, it is then necessary to retract the mirror 10 by again acting on the motor 14.

As a result of an incident, due e.g. to a failure of the motor 14 or its control system, it may become impossible to retract the mirror 10 with the aid of the motor 14. Under these conditions, the continuation of the mission makes it necessary to bring the mirror into the retracted position shown in continuous line form in FIG. 2 using other means.

According to the invention, this retraction can easily be controlled by heating the tubular, memory material member 72 up to the phase change temperature of said material, e.g. between 60° and 100° C. This heating is brought about by the heating means 76. When the phase change occurs, the tubular member 72 is elongated by an adequate value (e.g. approximately 1 mm) to ensure a separation of the truncated cone-shaped surfaces 58, 62 on the one hand and 60, 64 on the other by the elongation of the region 74 of the tie 46. As soon as separation has taken place, the spiral or torsion spring 40, which acts permanently between the parts 24 and 26 to exert a pivoting torque between these parts, rotates the second part 26 in counterclockwise direction considering FIG. 2. The pivoting of the second part 26 continues until the mirror-carrying portion 42 bears against the abutment 44, as described hereinbefore.

Thus, the desired result is obtained in shock-free manner and using a particularly simple, light and small retraction control device.

It should be noted that the invention is not limited to the embodiment described with reference to the drawings. Thus, even though it has an obvious interest in the space field, it can also be used in other fields. The device can also be used for controlling the retraction of a random mobile member, whereof the described mirror only constitutes an example in the particular case of an optical system. Finally, it should be noted that the displacement of the mobile member can be a random movement such as a rotation, a translation or a more complex movement.

I claim:
1. A unit, which comprises:
   a retractable mobile structure;
   a transmission mechanism:
   a displacement control mechanism bringing said mobile structure into at least one regulated position by said transmission mechanism; and
   a retraction control device controlling retraction of said mobile structure in a retracted position different from said regulated position, said retraction control device including a disconnectable connecting mechanism;
   a memory material member acting on the disconnectable connecting mechanism in order to control the disconnection thereof, during a change of state of the material, and
   a heating mechanism associated with said memory material member and controlling the change of state thereof on exceeding a predetermined temperature threshold.
2. Device according to claim 1, wherein said transmission mechanism comprises a first pan actuatable by said displacement control mechanism and a second part carrying the mobile structure, the disconnectable connecting mechanism including a tie traversing the first part and the second part, so as to normally join said first part and second part together by friction.
3. Device according to claim 2, wherein the tie defines a pivoting axis of the second part with respect to the first pan, and which comprises an elastic mechanism permanently exerting a pivoting torque between the first and second parts about said axis.
4. Device according to claim 2, wherein one of the first and second parts has a tubular portion with two truncated cone-shaped end surfaces, and the other of the first and second parts has two end fittings connected to one another by said tie through the tubular portion, so that the truncated cone-shaped bearing surfaces formed on the end fittings and complimentary of the truncated cone-shaped end surfaces formed on the annular portion are normally pressed against these latter surfaces by the tie.
5. Device according to claim 4, wherein the memory material member comprises a tubular member, mounted on the tie inside the tubular portion, so as to be able to move apart the truncated cone-shaped bearing surfaces formed on the end fittings from the truncated cone-shaped end surfaces formed on the tubular portion, during said change of state of the material.
6. Device according to claim 5, wherein thermally insulating washers are interposed between the end fittings and the memory material member.
7. Device according to claim 5, wherein the heating means are placed around the memory material member.
8. Device according to claim 4, wherein the truncated cone-shaped end surfaces and the truncated cone-shaped bearing surfaces are not self-locking.
9. Device according to claim 3, wherein the first part is pivotably supported by a fixed structure about the axis defined by the tie, and wherein the displacement control mechanism comprises a motor supported by the fixed structure and including an output shaft rotating the first part.
10. Device according to claim 2, wherein the tie has a region of reduced resistance allowing elongation thereof under the action of the memory material member, during the change of state of said material.

* * * * *

UNITED STATES PATENT AND TRADEMARK OFFICE
CERTIFICATE OF CORRECTION

PATENT NO. : 5,722,510
DATED : March 3, 1998
INVENTOR(S) : Daniel VIALE

It is certified that error appears in the above-identified patent and that said Letters Patent is hereby corrected as shown below:

On the title page, item [73] should be:

--[73] Assignee: AEROSPATIALE Societe Nationale Industrielle, Paris Cedex, France--

Signed and Sealed this

Twelfth Day of May, 1998

Attest:

BRUCE LEHMAN

Attesting Officer

Commissioner of Patents and Trademarks